(12) United States Patent
Minoshima et al.

(10) Patent No.: US 8,437,982 B2
(45) Date of Patent: May 7, 2013

(54) APPARATUS FOR MEASURING LOAD OF CONSTRUCTION MACHINE

(75) Inventors: Toshikazu Minoshima, Kasumigaura (JP); Takao Kurosawa, Ushiku (JP); Shinji Akino, Ushiku (JP); Takashi Yagyuu, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 486 days.

(21) Appl. No.: 12/699,233

(22) Filed: Feb. 3, 2010

(65) Prior Publication Data

US 2010/0211356 A1 Aug. 19, 2010

(30) Foreign Application Priority Data

Feb. 16, 2009 (JP) .................. 2009-033094

(51) Int. Cl.
*G01G 19/14* (2006.01)

(52) U.S. Cl.
USPC ........................................................ 702/174

(58) Field of Classification Search .................. 702/174
See application file for complete search history.

(56) References Cited

U.S. PATENT DOCUMENTS

| 6,633,006 B1 | 10/2003 | Wolf et al. | |
| 2005/0167165 A1* | 8/2005 | Takeda et al. | 177/136 |
| 2009/0102277 A1 | 4/2009 | Ezoe et al. | |

FOREIGN PATENT DOCUMENTS

| JP | 08-165681 A | | 6/1996 |
| JP | 2000-198402 A | | 7/2000 |
| JP | 2002-037405 A | | 2/2002 |
| JP | 2002-523735 A | | 7/2002 |
| JP | 2005-008094 | * | 1/2005 |
| JP | 2005-43267 A | | 2/2005 |
| JP | 2005-084003 | * | 3/2005 |
| JP | 2007-210592 A | | 8/2007 |

OTHER PUBLICATIONS

English Abstract of JP 2005-084003, Mar. 2005.*
English Abstract of JP 2005-008094, Jan. 2005.*

* cited by examiner

*Primary Examiner* — Michael Nghiem
(74) *Attorney, Agent, or Firm* — Mattingly & Malur, PC

(57) ABSTRACT

A load measuring device for a construction machine includes a processing unit for acquiring signals indicative of cylinder pressure of front and rear suspension cylinders via pressure sensors and computing a weight value of a load put on a dump body of the construction machine. When the construction machine is traveling on a curvilinear route, the construction machine makes the output of the weight value ineffective. In particular, when the differential speed value between the rear wheels, received from a speed difference detector, is below a preset value, the arithmetic unit outputs a loading weight W computed by the processing unit, as final loading weight, and so that when the differential speed exceeds the preset value, the arithmetic unit makes ineffective the computed loading weight W as the final loading weight output.

4 Claims, 4 Drawing Sheets

APPARATUS FOR MEASURING LOAD OF CONSTRUCTION MACHINE

BACKGROUND OF THE INVENTION

1. Field of the Invention

The present invention relates to an apparatus for measuring a load of a construction machine. More particularly, the invention concerns a load measuring apparatus for a construction machine suitable for improving measurement accuracy of a load being carried by a dump truck.

2. Description of the Related Art

During load measurement of such a construction machine as described above, it depends greatly upon the route whether an appropriate load measurement condition can be obtained under normal loaded-traveling conditions of the machine. At the rock-quarrying sites where the natural ground is cut through to extract stones, dump trucks and the like usually descend a slope as they are after being loaded with extracted stones on an upper section of the mountain. In these cases, there has been the problem that since a flat location is absent on the traveling route, the load cannot be accurately measured.

In order to remedy this problem, a load measuring apparatus for a construction machine measures and records a load in appropriate timing essentially free from impacts of a traveling state of the machine and a state of the ground surface, for example, when the machine travels in reverse for unloading. Such an apparatus is described in JP-2005-43267-A, for example.

SUMMARY OF THE INVENTION

During load measurement of the above construction machine, acquiring load measurement data at an earlier phase is desired for better results of data management. It is therefore effective to measure the load during normal loaded-traveling conditions.

However, since the construction machine may lose the left-right balance during loaded traveling on a curvilinear route, load measurement should not to be performed when the machine is traveling on such a curvilinear route.

The construction machine in the invention described in above JP-2005-43267-A is also likely to take a curvilinear route to move in reverse for unloading. Also in this case, load measurement also needs to be withheld for the same reason. However, no appropriate measure for remedying such a measuring environment has heretofore been taken.

The present invention has been made on the basis of the foregoing, and an object of the invention is to provide a load measuring apparatus for a construction machine, adapted so that when the construction machine is traveling on a curvilinear route, the construction machine makes ineffective output of a weight value of a load measured during the travel.

In order to attain the above object, the present invention provides, as a first aspect thereof, a load measuring apparatus for a construction machine that comprises a processing unit for acquiring signals indicative of cylinder pressure of front and rear suspension cylinders via pressure sensors and computing a weight value of a load put on a dump body of the construction machine, further comprises: rear-wheel speed detectors for detecting speeds of left and right rear wheels, respectively, of the construction machine; a speed difference detector for detecting a difference between the speed values sent from the rear-wheel speed detectors; and final loading-weight confirmation means with a final-confirmation arithmetic unit adapted so that when the differential speed value between the rear wheels, received from the speed difference detector, is equal to or less than a preset value, the arithmetic unit outputs the loading weight W computed by the processing unit, as final loading weight, and so that when the differential speed exceeds the preset value, the arithmetic unit makes ineffective the computed loading weight W as the final loading weight output.

A second aspect of the present invention is that the load measuring apparatus for a construction machine, described above as the first aspect of the invention, further comprises: a vehicle chassis speed detector for detecting a speed of the vehicle chassis; a loading-weight fluctuation range measuring unit for measuring a fluctuation range of the loading weight value W sent from the processing unit, by repeating a sampling measurement operation several times within a definite time; and a loading-weight minimum fluctuation range confirmation unit for calculating an average value of the data measurements sent from the loading-weight fluctuation range measuring unit, and then confirming whether or not a difference between a maximum measured value and a minimum measured value has become a minimum allowed for the average value. In the second aspect of the present invention, the final-confirmation arithmetic unit of the final loading-weight confirmation means in the first aspect of the invention is configured such that: when condition 1 under which the speed of the vehicle chassis from the vehicle chassis speed detector exceeds a preset value, condition 2 under which the loading weight value from the loading-weight minimum fluctuation range confirmation unit is within a minimum fluctuation range, and condition 3 under which the rear-wheel differential speed value from the speed difference detector is below a preset value, are all satisfied, the arithmetic unit outputs the loading weight W computed by the processing unit, as final loading weight; and when at least one of the above three conditions is not satisfied, the arithmetic unit makes ineffective the computed loading weight W as the final loading weight output.

A third aspect of the present invention is that the final-confirmation arithmetic unit in the final loading-weight confirmation means in the second aspect of the invention further includes the procedure of sampling the vehicle chassis speed from the vehicle chassis speed detector several times and then after processing an average value of the samplings, when any speed changes occurring within several seconds are equal to or less than the preset value, handling condition 1 as satisfied.

A fourth aspect of the present invention is that the final-confirmation arithmetic unit in the final loading-weight confirmation means in the second aspect of the invention further includes a procedure in which, when the rear-wheel differential speed value from the speed difference detector is smaller than the preset value and also conditions 1 and 2 are satisfied after several seconds, the final loading-weight confirmation means outputs the loading weight value W received from the processing unit, as the final loading weight.

The present invention provides, as a fifth aspect thereof, a load measuring apparatus for a construction machine that comprises a processing unit for acquiring signals indicative of cylinder pressure of front and rear suspension cylinders via pressure sensors and computing a weight value of a load put on a dump body of the construction machine, further comprises: steering angle detectors each for detecting a steering angle of a left or right front wheel on the construction machine; and final loading-weight confirmation means with a final-confirmation arithmetic unit adapted so that when the steering angle values from the steering angle detectors are the same as a preset value, the arithmetic unit outputs the loading weight W computed by the processing unit, as final loading weight, and so that when the steering angle values exceed the preset value, the arithmetic unit makes ineffective the computed loading weight W as the final loading weight output.

A sixth aspect of the present invention is that the construction machine in any one of above items 1 to 5 is a dump truck for transporting the load on the dump body from one place to another.

According to the present invention, when the construction machine is traveling on a curvilinear route, measuring accuracy of the loading weight under a traveling state of the construction machine improves since output of the loading weight measured during the travel is made ineffective. Management of productivity of the construction machine improves as a result.

DESCRIPTION OF THE PREFERRED EMBODIMENT

Hereunder, a load measuring apparatus for a construction machine that is an embodiment of the present invention will be described with reference to the accompanying drawings.

Figure 1:
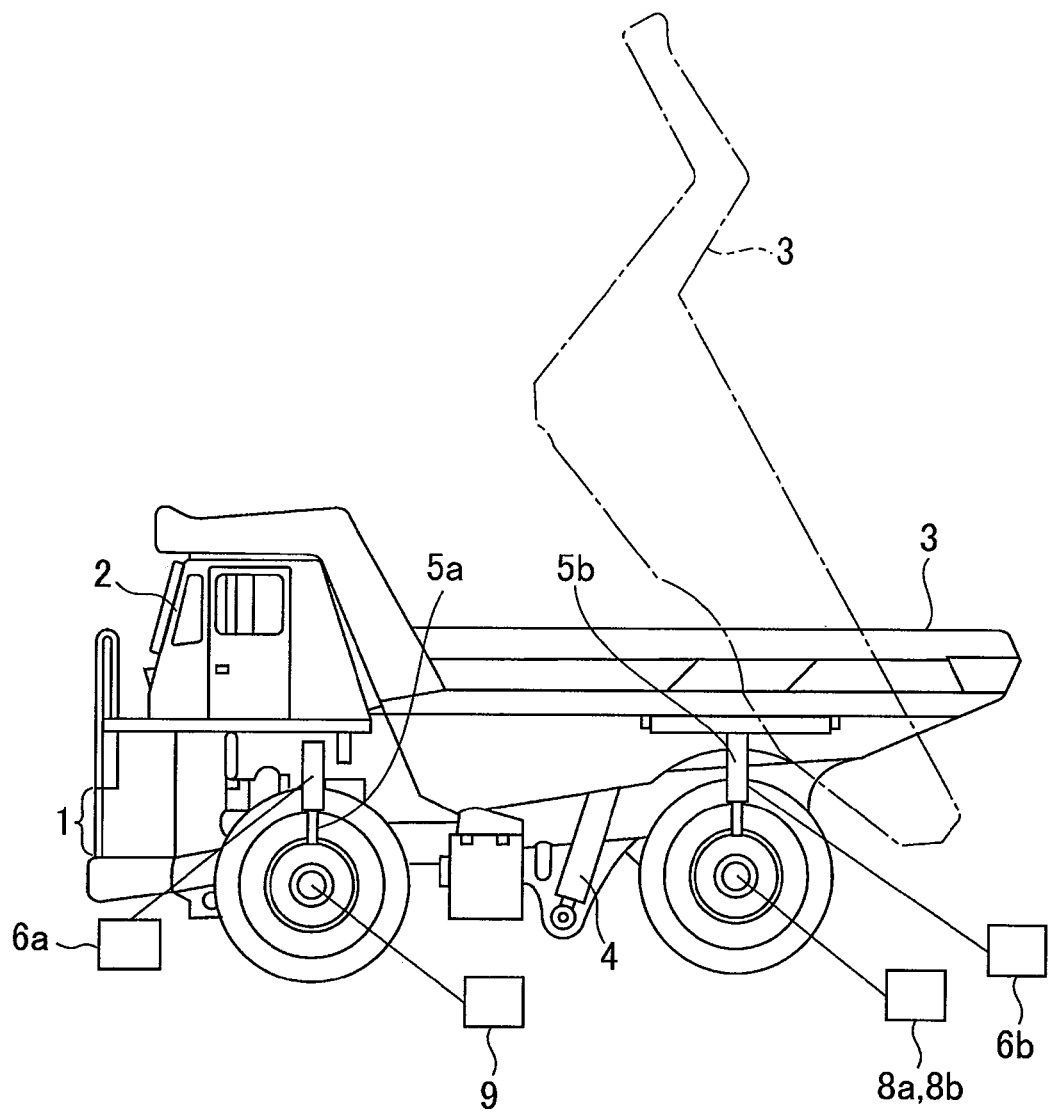
FIG. 1 is a side view of a dump truck that shows an example of a construction machine to which a load measuring apparatus for the present invention is applied.

FIGS. 1 to 4 each show the embodiment of the present invention that is the load measuring apparatus for a construction machine. FIG. 1 is a side view of a dump truck that shows an example of the load measuring apparatus, FIG. 2 a configuration diagram of the load measuring apparatus, FIG. 3 a functional configuration diagram of the load measuring apparatus, and FIG. 4 a process flow diagram of the load measuring apparatus.

As shown in FIG. 1, the dump truck applying the load measuring apparatus of the present invention includes: a vehicle chassis 1; an operator cab 2 provided on a front section of the vehicle chassis 1; a dump body 3 retained by the vehicle chassis 1 and used for loading the truck; a dump body actuating cylinder 4 for moving the dump body 3 in upward and downward directions as indicated by a single-dotted line; front left and right suspension cylinders 5a arranged on front left and right wheels, respectively, to support the vehicle chassis 1, the dump body 3, and a heavy object including the load put on the dump body 3; and rear left and right suspension cylinders 5b arranged on rear left and right wheels, respectively, to support the vehicle chassis 1, the dump body 3, and the heavy object including the load put on the dump body 3.

A pressure sensor 6a or 6b for measuring a suspension cylinder pressure is mounted on each suspension cylinder 5a and 5b, as a device for measuring weight of the load. The cab 2 on the vehicle chassis 1 contains an inclination sensor 7 to detect a longitudinal inclination angle of the vehicle chassis 1. The left/right rear wheels have rear-wheel speed detectors 8a and 8b to detect respective rotational speeds. The vehicle chassis 1 is provided with a vehicle chassis speed detector 9 for detecting a speed of the vehicle chassis 1. Measurement signals from these sensors are sent to a processing unit for load measurement and calculation. The processing unit is described later herein.

A configuration and functional blocks of the processing unit for load measurement are next described with reference to FIGS. 2 and 3.

Figure 2:
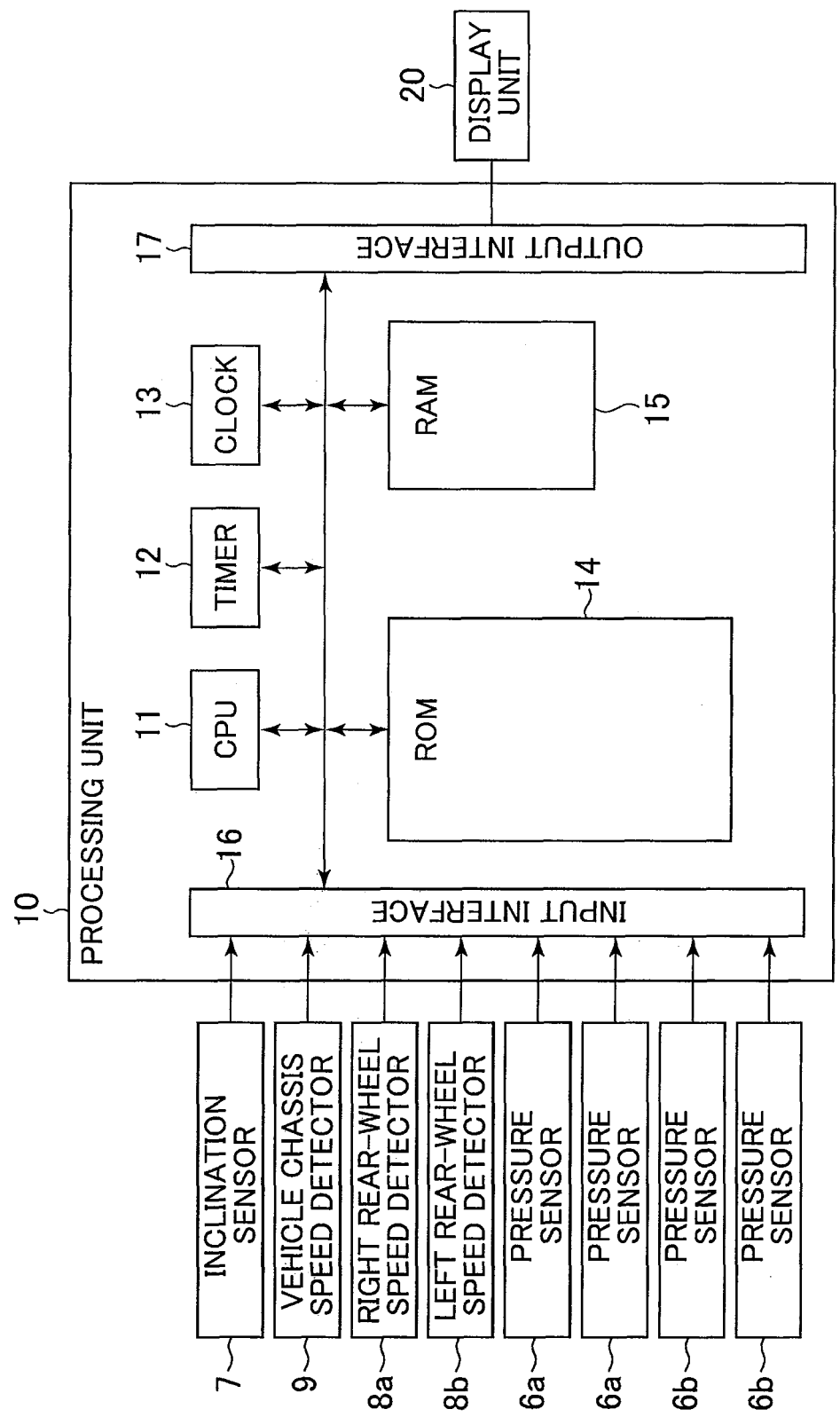
FIG. 2 is a configuration diagram showing a load measuring apparatus for a construction machine that is an embodiment of the present invention.

FIG. 2 is a configuration diagram showing the configuration of the processing unit used in the present embodiment of the load measuring apparatus of the invention. FIG. 3 is a block diagram showing a functional configuration of the processing unit used in the present embodiment of the load measuring apparatus of the invention. In these figures, constituent elements each assigned the same reference number as in FIG. 1 are identical. Detailed description of these elements is therefore omitted hereinafter.

As shown in FIG. 2, detection signals from the pressure sensors 6a and 6b for measuring the cylinder pressures of the front left and right suspension cylinders 5a and the rear left and right suspension cylinders 5b, are input to the processing unit 10 of the load measuring apparatus. Detection signals from the rear-wheel speed detectors 8a and 8b for detecting the rotational speeds of the left and right rear wheels 6, and a detection signal from the vehicle chassis speed detector 9 for detecting a speed of the vehicle chassis 1 are also input to the processing unit 10.

The processing unit 10 includes, as shown in FIG. 2, an arithmetic unit 11 for arithmetic processing, a timer 12 for driving the arithmetic unit 11, a clock 13 for acquiring time of the day, a read-only memory (ROM) 14 to save various processes (programs) therein, a random-access memory (RAM) 15 save variables and measured load data therein, an input interface 16 for communication as well as for sensor input, and an output interface 17 for transmitting arithmetic results from the arithmetic unit 11 to a display unit and an external unit. Also, the processing unit 10 can display the weight of the load on the display unit 20 installed in a management center or in the cab of the vehicle chassis 1, via the output interface 17.

Figure 3:
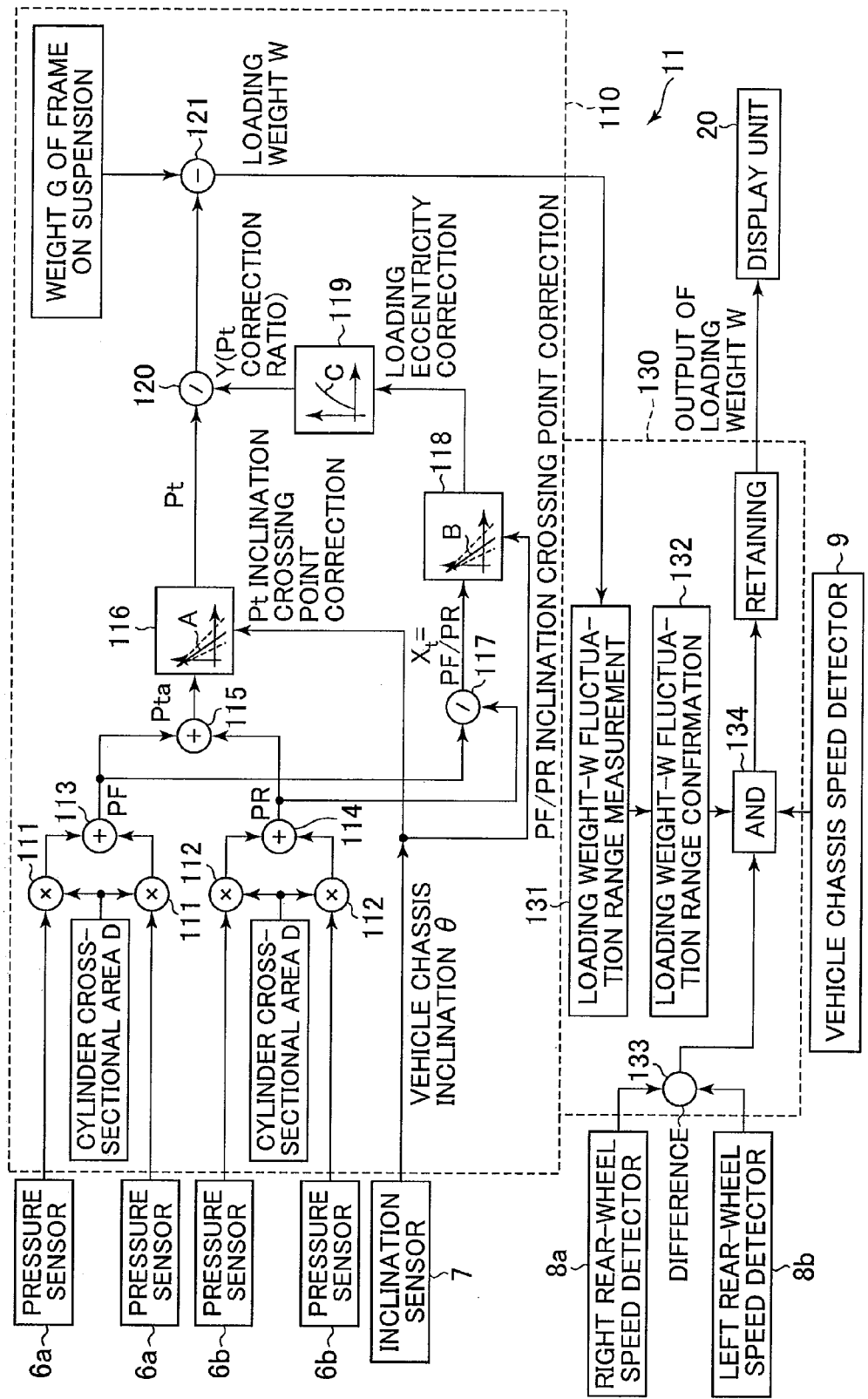
FIG. 3 is a functional configuration diagram showing the load measuring apparatus for a construction machine that is the embodiment of the present invention.

Various data shown in FIG. 3 is stored in the RAM 15. The data includes: values D of cross-sectional areas of the front left and right suspension cylinders 5a and the rear left and right suspension cylinders 5b; weight G of the vehicle chassis 1 supported by the front left/right suspension cylinders 5a and the rear left/right suspension cylinders 5b; total-load-Pt correction characteristic A for calculating, from a vehicle-chassis inclination angle θ detected by the inclination sensor 7, a total preload Pt acting upon the suspension cylinders 5a and 5b, as a total load Pt applied when no inclination is acting; front/rear load correction ratio-X characteristic B for calculating, from the vehicle-chassis inclination angle θ detected by the inclination sensor 7, a suspension load ratio Xt (Xt=PF/PR) between a load PF acting upon the front suspension cylinders 5a and a load PR acting upon the rear suspension cylinders 5b, as a load ratio X obtained when no inclination is acting; and total-load-Pt correction ratio characteristic C for calculating a loading-eccentricity correction ratio Xa of the total load Pt from front/rear load correction ratio X.

Next, a processing functional configuration of the arithmetic unit 11 in the processing unit 10 is described below with reference to FIG. 3. Briefly, the arithmetic unit 11 includes a loading-weight computing element 110 for computing the weight of the load put on the dump body 3, and a final loading-weight confirmation element 130 for confirming final load weight.

The loading-weight computing element 110 includes: multipliers 111 that each compute the load acting upon either the left or right front suspension cylinder 5a, by multiplying the memory-stored value D of the cross-sectional area of the particular suspension cylinder 5a by the cylinder pressure value from the corresponding pressure sensor 6a for measuring the cylinder pressure of the cylinder 5a; multipliers 112 that each compute the load acting upon either the left or right rear suspension cylinder 5b, by multiplying the memory-stored value D of the cross-sectional area of the particular suspension cylinder 5b by the cylinder pressure value from the corresponding pressure sensor 6b for measuring the cylinder pressure of the cylinder 5b; an adder 113 that adds the load values of the rear left and right suspension cylinders 5a, sent from the multipliers 111, and computes the front load PF acting upon the front suspension cylinders 5a; an adder 114 that computes the value sent from the multipliers 112 as the rear load PR acting upon the rear left and right suspension cylinders 5b; an adder 115 that adds the front load value PF from the adder 113 and the rear load PR value from the adder 114, and computes a total load Pta of the suspension cylinders 5a and 5b; a total-load correction computing section 116 that computes the total load Pta of the suspension cylinders 5a and 5b, based upon the inclination angle value θ from the inclination sensor 7 and upon the memory-stored correction characteristic A of the total load Pt, and obtains a total load correction value Pt obtained when the vehicle chassis 1 is not inclining; a divider 117 that computes the front/rear load ratio Xt (Xt=PF/PR) between the front load value PF from the adder 113 and the rear load value PR from the adder 114; a front/rear load ratio correction computing section 118 that computes the front/rear load ratio Xt from the divider 117, based upon the inclination angle value θ from the inclination sensor 7 and upon the memory-stored correction characteristic B of the front/rear load ratio X, and obtains a front/rear load correction ratio X obtained when the vehicle chassis 1 is not inclining; a total-load correction ratio computing section 119 that computes the loading-eccentricity correction ratio Xa of the total load Pt, based upon the front/rear load correction ratio X from the front/rear load ratio correction computing section 118 and upon the loading-eccentricity correction ratio characteristic C of the total load Pt; a divider 120 that divides the total load correction value Pt from the total-load correction computing section 116, by a loading-eccentricity correction ratio Y of the total load Pt from the total-load correction ratio computing section 119; and a subtractor 121 that computes the loading weight W by subtracting the weight G of the vehicle chassis 1 supported by the front left/right suspension cylinders 5a and the rear left/right suspension cylinders 5b, based upon the total load Pt from the divider 120.

The final loading-weight confirmation element 130 includes: a loading-weight-W fluctuation range measuring unit 131 for measuring a fluctuation range of the loading weight value W sent from the loading-weight computing element 110, by repeating a sampling measurement operation several times within a definite time; a loading-weight minimum fluctuation range confirmation unit 132 for calculating an average value of the data measurements sent from the loading-weight-W fluctuation range measuring unit 131, and then confirming that a difference between a maximum measured value and a minimum measured value has become a minimum allowed for the average value; a speed difference detector 133 for computing a difference between the speed values from the rear-wheel speed detectors 8a and 8b for detecting the rotational speeds of the left and right rear wheels; and a final-confirmation arithmetic unit (logical product computing unit) 134 adapted so that when condition 1 under which the speed of the vehicle chassis 1 from the vehicle chassis speed detector 9 exceeds a preset value (e.g., several kilometers per hour), that is, under which the vehicle is in a traveling state that enables load measurement, condition 2 under which the loading weight value from the loading-weight minimum fluctuation range confirmation unit 132 is within a minimum fluctuation range, and condition 3 under which the rear-wheel differential speed value from the speed difference detector 133, which is based on the speed values from the rear-wheel speed detectors 8a and 8b, is below a preset value, that is, under which the vehicle is judged to be traveling on a rectilinear route, not a curvilinear route, are all satisfied, the arithmetic unit 134 outputs the loading weight W computed by the subtractor 121, as final loading weight, and so that when the above conditions are not satisfied, the arithmetic unit 134 makes ineffective the loading weight W computed by the subtractor 121 as the final loading weight output.

Next, process operation of the load measuring apparatus of a construction machine that is the above-described embodiment of the present invention is described below with reference to FIGS. 2 to 4.

Figure 4:
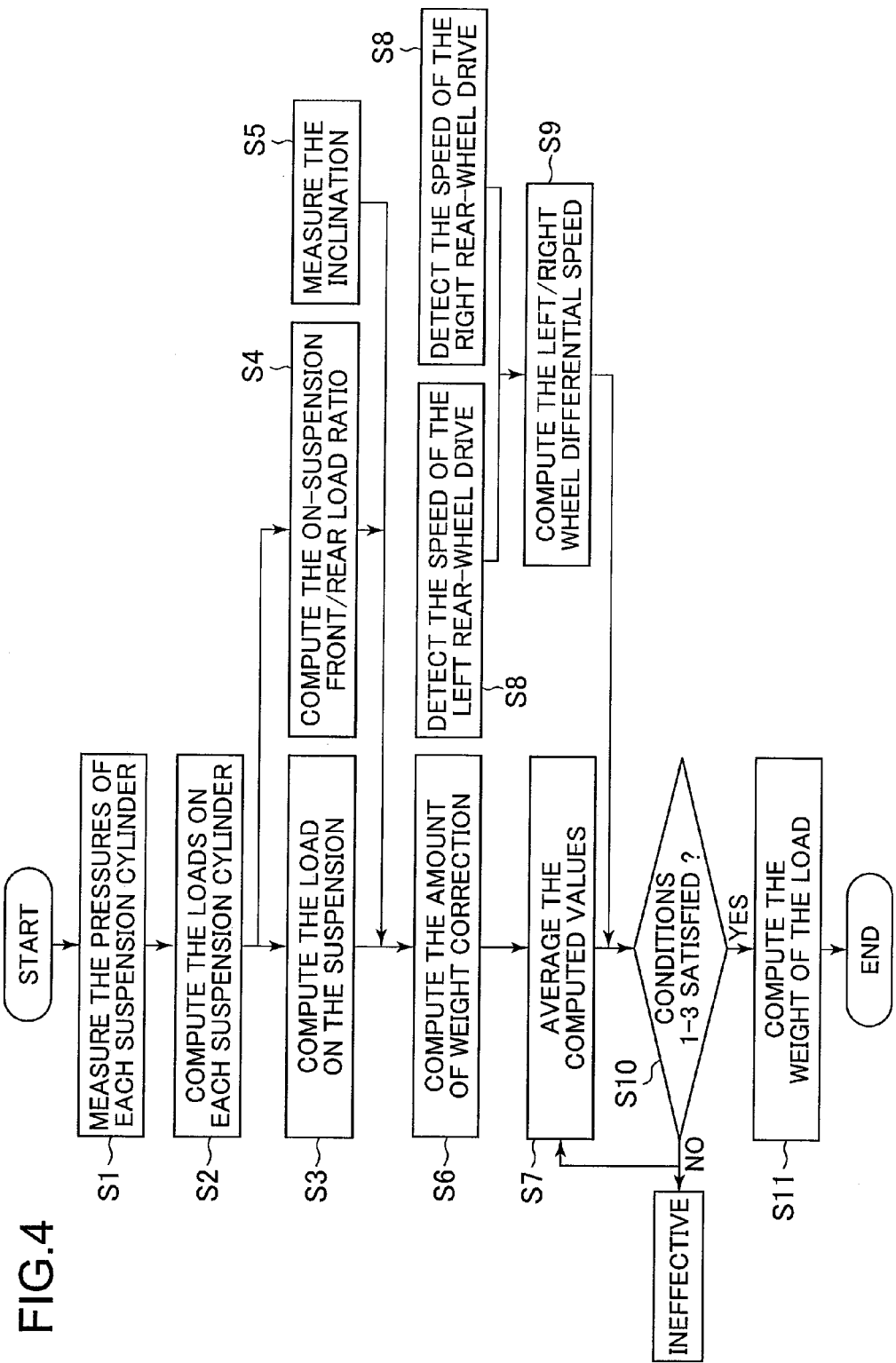
FIG. 4 is a process flow diagram showing the load measuring apparatus for a construction machine that is the embodiment of the present invention.

FIG. 4 is a process flow diagram showing the embodiment of the present invention that is the load measuring apparatus of a construction machine.

Each multiplier 111 in the loading-weight computing element 110 of the arithmetic unit 11 (shown in FIG. 3) in the processing unit 10 multiplies the memory-stored value D of the cross-sectional area of the front left or right suspension cylinder 5a by the cylinder pressure thereof that has been acquired by the loading-weight computing element 110 after being detected by the corresponding pressure sensor 6a (step S1 in FIG. 4). The multiplier 111 thus computes the load upon the front left or right suspension cylinder 5a (step S2 in FIG. 4).

Also, each multiplier 112 multiplies the memory-stored value D of the cross-sectional area of the rear left or right suspension cylinder 5b by the cylinder pressure thereof that has been acquired by the loading-weight computing element 110 after being detected by the corresponding pressure sensor 6b (step S1 in FIG. 4). The multiplier 112 thus computes the load upon the rear left or right suspension cylinder 5b (step S2 in FIG. 4).

The adder 113 adds the load values of the front left and right suspension cylinders 5a, sent from each multiplier 111, and computes the front load PF acting upon the front suspension cylinders 5a. The adder 114 adds the load values of the rear left and right suspension cylinders 5b, sent from each multiplier 112, and computes the rear load PR acting upon the rear suspension cylinders 5b. The adder 115 adds the front load value PF sent from the adder 113 and the rear load value PR sent from the adder 114, and computes the total load Pta of the suspension cylinders 5a and 5b (step S3 in FIG. 4).

The divider 117 computes the front/rear load ratio Xt (Xt=PF/PR) between the front load value PF from the adder 113 and the rear load value PR from the adder 114 (step S4 in FIG. 4).

On the basis of the inclination angle value (measured in step S5 of FIG. 4) from the inclination sensor 7 and the memory-stored correction characteristic A of the total load Pt, the total-load correction computing section 116 computes the total load value Pta of the suspension cylinders 5a and 5b from the adder 115, as the total load correction value Pt obtained when the vehicle chassis 1 is not inclining (step S6 in FIG. 4).

On the basis of the inclination angle value (measured in step S5 of FIG. 4) from the inclination sensor 7 and the memory-stored correction characteristic B of the front/rear load ratio X, the front/rear load ratio correction computing section 118 computes the front/rear load ratio value Xt from the divider 117 as the front/rear load ratio X obtained when the vehicle chassis 1 is not inclining (step S6 in FIG. 4).

The total-load correction ratio computing section 119 computes the loading-eccentricity correction ratio Xa of the total load Pt, based upon the front/rear load correction ratio X from the front/rear load ratio correction computing section 118 and upon the loading-eccentricity correction ratio characteristic C of the total load Pt (step S6 in FIG. 4).

The divider 120 divides the total load correction value Pt from the total-load correction computing section 116, by the loading-eccentricity correction ratio Y of the total load Pt from the total-load correction ratio computing section 119 (step S6 in FIG. 4). The subtractor 121 computes the loading weight W by subtracting the weight G of the vehicle chassis 1 supported by the front left/right suspension cylinders 5*a* and the rear left/right suspension cylinders 5*b* (step S6 in FIG. 4).

Next, the loading-weight-W fluctuation range measuring unit 131 in the final loading-weight confirmation element 130 measures a fluctuation range of the loading weight value W sent from the loading-weight computing element 110, by repeating a sampling measurement operation several times within a definite time. The loading-weight minimum fluctuation range confirmation unit 132 calculates the average value of the data measurements sent from the loading-weight-W fluctuation range measuring unit 131, and then confirms that the difference between the maximum measured value and the minimum measured value has become the minimum allowed for the average value (step S7 in FIG. 4). The speed difference detector 133 computes the difference between the rear-wheel speed values (measured in step S8 of FIG. 4) from the rear-wheel speed detectors 8*a* and 8*b* for the detection of the left/right rear wheel speeds (step S9 in FIG. 4).

The final-confirmation arithmetic unit 134 is configured so that when three predetermined conditions are all satisfied in step S10 of FIG. 4, the arithmetic unit 134 outputs the loading weight W computed by the subtractor 121, as final loading weight, in step S11 of FIG. 4. The three conditions are: condition 1 under which the speed of the vehicle chassis 1 from the vehicle chassis speed detector 9 exceeds the preset value (e.g., several kilometers per hour), that is, under which the vehicle is in a traveling state that enables load measurement; condition 2 under which the loading weight value from the loading-weight minimum fluctuation range confirmation unit 132 is within the minimum fluctuation range; and condition 3 under which the rear-wheel differential speed value from the speed difference detector 133, which is based on the speed values from the rear-wheel speed detectors 8*a* and 8*b*, is below the preset value, that is, under which the vehicle is judged to be traveling on a rectilinear route, not a curvilinear route. When above conditions 1 to 3 are not satisfied, the final-confirmation arithmetic unit 134 makes ineffective output of the subtractor-computed loading weight W as the final loading weight.

According to the above-described embodiment of the present invention, when the construction machine is traveling on a curvilinear route, measuring accuracy of the loading weight under the traveling state of the construction machine improves since the output of the loading weight measured during the travel is made ineffective. Management of productivity of the construction machine improves as a result.

It has been described in the above embodiment that when condition 1 under which the speed of the vehicle chassis 1 from the vehicle chassis speed detector 9 exceeds the preset value (e.g., several kilometers per hour), that is, under which the vehicle is in a traveling state that enables load measurement, condition 2 under which the loading weight value from the loading-weight minimum fluctuation range confirmation unit 132 is within the minimum fluctuation range, and condition 3 under which the rear-wheel differential speed value from the speed difference detector 133, which is based on the speed values from the rear-wheel speed detectors 8*a* and 8*b*, is below the preset value, that is, under which the vehicle is judged to be traveling on a rectilinear route, not a curvilinear route, are all satisfied, the final-confirmation arithmetic unit 134 outputs the loading weight W computed by the subtractor 121, as the final loading weight. However, when above condition 3 is satisfied, the final-confirmation arithmetic unit 134 can also output the loading weight W computed by the subtractor 121, as the final loading weight.

In addition, it has been described that condition 1 refers to a case in which the speed of the vehicle chassis 1 from the vehicle chassis speed detector 9 exceeds the preset value (e.g., several kilometers per hour), that is, a case in which the vehicle is in a traveling state that enables load measurement. However, when the arithmetic unit 134 samples the vehicle chassis speed several times and then processes the average value of the samplings, when any speed changes occurring within several seconds are equal to or less than the preset value, the arithmetic unit can also handle condition 1 as satisfied.

Furthermore, it has been described that when the differential speed from the speed difference detector 133, which is based on the speed values from the rear-wheel speed detectors 8*a* and 8*b*, is below the preset value, the final-confirmation arithmetic unit 134 makes ineffective output since condition 3 is not satisfied. However, after the deactivation, if the difference between the speed values from the rear-wheel speed detectors 8*a* and 8*b* is smaller than the preset value and also above conditions 1 and 2 are satisfied after several seconds, the loading weight value W from the subtractor 121 can also be output as the final loading weight.

In the above-described embodiment, while detection of the state under which the dump truck, or the construction machine, is traveling on a curvilinear route has been based upon the difference between the speed values from the rear-wheel speed detectors 8*a* and 8*b*, steering angles of the left and right front wheels on the construction machine can likewise be obtained with steering angle detectors that detect the respective steering angles.

In this case, when the steering angle values from the steering angle detectors are the same as a preset value (e.g., a steering angle during traveling on a rectilinear route), the final-confirmation arithmetic unit 134 in the final loading-weight confirmation element 130 outputs the loading weight W computed by the processing unit, as the final loading weight. When the steering angle values exceed the preset value, the arithmetic unit 134 executes a sequence of deactivating the loading weight W computed by the processing unit, as the final loading weight output.

What is claimed is:

1. An apparatus for measuring a load carried by a construction machine having left and right rear wheels, the apparatus including a processing unit for acquiring signals indicative of cylinder pressure of front and rear suspension cylinders via respective pressure sensors and computing a weight value of a load put on a dump body of the construction machine, the apparatus comprising:

rear-wheel speed detectors for detecting speeds of the left and right rear wheels, respectively, of the construction machine;

the processing unit receiving speed values from the rear wheel speed detectors, the processing unit detecting a difference between the speed values from the rear-wheel speed detectors, and the processing unit outputting a computed loading weight W as a final loading weight when the detected differential speed value between the rear wheels is below a preset value, and when the detected differential speed exceeds the preset value, the processing unit makes ineffective the computed loading weight W as the final loading weight output.

2. The apparatus for measuring a load carried by a construction machine according to claim 1, the apparatus further comprising:

a vehicle chassis speed detector for detecting a speed of the vehicle chassis; wherein the processing unit measuring a fluctuation range of the loading weight value W by repeating a sampling measurement operation several times within a definite time, and the processing unit calculating an average value of the data measurements and confirming whether or not a difference between a maximum measured value and a minimum measured value has become a minimum allowed for the average value, and wherein when condition 1 under which the speed of the vehicle chassis from the vehicle chassis speed detector exceeds a preset value, condition 2 under which the loading weight value from the loading-weight minimum fluctuation range confirmation unit is within a minimum fluctuation range, and condition 3 under which the rear-wheel differential speed value from the speed difference detector is below a preset value, are all satisfied, the processing unit outputting the loading weight W, as final loading weight, and such that when at least one of the three conditions is not satisfied, the processing unit makes ineffective the computed loading weight W as the final loading weight output.

3. The apparatus for measuring a load carried by a construction machine according to claim 2, wherein the processing unit sampling the vehicle chassis speed from the vehicle chassis speed detector several times and then after processing an average value of the samplings, when any speed changes occurring within several seconds are within the preset value, handling condition 1 as satisfied.

4. The apparatus for measuring a load carried by a construction machine according to claim 2, wherein when the rear-wheel differential speed value from the speed difference detector is smaller than the preset value and also conditions 1 and 2 are satisfied after several seconds, the processing unit outputting the loading weight value W as the final loading weight.

* * * * *